United States Patent [19]

Newing

[11] 4,242,252

[45] Dec. 30, 1980

[54] PREPARATION OF ORGANOPOLYSILOXANE RESINS WITH WEAK ORGANIC BASES

[75] Inventor: Charles W. Newing, Toledo, Ohio

[73] Assignee: Owens-Illinois, Inc., Toledo, Ohio

[21] Appl. No.: 23,928

[22] Filed: Mar. 26, 1979

[51] Int. Cl.$^3$ ............................................... C08K 5/05
[52] U.S. Cl. .............................. 260/33.4 SB; 528/10; 528/12; 528/21; 528/32; 528/40; 528/43
[58] Field of Search ................ 528/21, 12, 10, 32, 528/40, 43; 260/33.4 SB

[56] References Cited

U.S. PATENT DOCUMENTS

| | | | |
|---|---|---|---|
| 3,389,114 | 6/1968 | Burzynski et al. | 528/10 |
| 3,412,128 | 11/1968 | Nielsen | 528/21 |
| 3,428,599 | 2/1969 | Newing, Jr. | 528/22 |
| 3,474,070 | 10/1969 | Levene | 528/15 |
| 3,479,316 | 11/1969 | Levene | 528/19 |

*Primary Examiner*—Melvyn I. Marquis
*Attorney, Agent, or Firm*—David R. Birchall; Myron E. Click; David H. Wilson

[57] ABSTRACT

A process for forming organopolysiloxanes from hydrolyzable silanes and the resulting products are disclosed, characterized in that condensation of the silanes is carried out in the presence of a stabilizing amount of a weak organic base, such as quinoline, having an ionization constant in water no greater than about $1 \times 10^{-7}$ at 25° C. After hydrolysis of the silane, the resulting silanol is partially condensed to form the organopolysiloxane. During such condensation, the weak organic base provides improved stability to the organopolysiloxane solution against gelation prior to the time the organopolysiloxane is shaped and cured to a final thermoset form.

20 Claims, No Drawings

PREPARATION OF ORGANOPOLYSILOXANE RESINS WITH WEAK ORGANIC BASES

BACKGROUND OF THE INVENTION

Hydrolysis-condensation products of hydrolyzable silanes, such as methyltrialkoxysilanes, are of commercial interest, because they possess several properties unique among organopolysiloxanes. Since, for example, such products have no carbon-to-carbon bonds, they transmit well ultraviolet radiation, and of all organopolysiloxanes they contain a relatively high proportion of inorganic constituents.

However, it is extremely difficult to control the hydrolysis and condensation rates of hydrolyzable silanes. Most silanols, that is, silicon compounds which possess one or more hydroxyl groups bonded directly to a silicon atom, tend to form the corresponding ether analogs (siloxanes) by an equilibrium reaction that may be regarded as the loss of one molecule of water per two such hydroxyl groups. The reactivity of silanols, especially silanetriols, to form siloxanes is so great that selectivity in product formation is seldom possible, and complexity of the reaction mixture often precludes identification of specific products.

The high activity of most silanols makes it desirable to form them in situ. This is usually accomplished by hydrolysis of precursors which contain silicon atoms attached to substituents convertible to hydroxyl groups. These hydrolysis reactions may be illustrated as

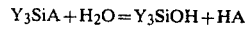

$Y_3SiA + H_2O = Y_3SiOH + HA$

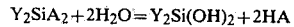

$Y_2SiA_2 + 2H_2O = Y_2Si(OH)_2 + 2HA$

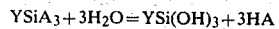

$YSiA_3 + 3H_2O = YSi(OH)_3 + 3HA$

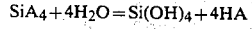

$SiA_4 + 4H_2O = Si(OH)_4 + 4HA$ in which Y represents, for example, an organic group such as hydrocarbon radical, and A represents a hydrolyzable group such as alkoxy, acyloxy, halogen, etc.

It is known that an acid medium catalyzes hydrolysis and siloxane formation in the types of reactions just described. Control of the reaction conditions and particularly of the acid pH condition has been used to prevent an uncontrollable reaction, such as premature gelation. The acute sensitivity of silanetriols, such as methyl silanetriol, to acid catalysis in general precluded the use, as precursors, of methyltrichlorosilane, methyltriacetoxysilane, and similar derivitives which liberate acid by-products during hydrolysis. As a result attention has previously been directed and restricted mainly to trialkoxysilanes such as methyltrialkoxysilane. Also, these compounds had to be quite pure which appreciably raised the cost of commercialization. The presence of impurities also accelerated gelation.

Accordingly, prior research relating to the hydrolysis-condensation of hydrolyzable silanes and particularly trialkoxysilanes, to organopolysiloxanes has concentrated on the amount of acid or type of catalyst used. To avoid gelation and effect hydrolysis and polysiloxane formation at a conveniently rapid and controllable rate, the amount of acid catalyst, such as hydrochloric acid, used was previously fairly carefully regulated. A slight deviation from a prescribed amount, such as from inadvertent mistake, could cause large variations in the polymer produced. The reactions of hydrolysis and condensation are normally so fast and sensitive that they could not be easily controlled.

With respect to other known art in this field, U.S. Pat. No. 3,389,114 to Burzynski and Martin discloses using a reaction mixture of a methyltrialkoxysilane and from 0 to about 700 parts of acid, as an upper limit, expressed as HCl, per million parts of total silane reactant material and water. This disclosure is limited to methyltrialkoxysilanes in which the alkyl group has less than four carbon atoms, since the system is regarded as even more sensitive to other alkyltrialkoxysilanes.

U.S. Pat. No. 3,428,599 to Newing teaches prevention of premature gelation of organopolysiloxanes by controlling the acidity of the polymers during a precuring step with a silazane such as hexamethyldisilazane.

U.S. Pat. No. 3,474,070 to Levene discloses a process for hydrolyzing organotrialkoxysilanes at neutral conditions using an ion-containing hydrolysis catalyst, such as a ferric alkoxide or a ferric chelate.

U.S. Pat. No. 3,479,316 to Levene describes a process for hydrolyzing trialkoxysilanes at neutral conditions using a vanadium-containing hydrolysis catalyst such as trialkylvanadate.

SUMMARY OF THE INVENTION

A principal object of the present invention is to provide a process for preparing organopolysiloxanes from hydrolyzable silanes such as trialkoxysilanes and the resulting products, in which the condensation of the silane is carried out in the presence of a weak organic base, such as a trivalent nitrogen-containing weak organic base, having an ionization constant in water no greater than about $1 \times 10^{-7}$ at 25° C. A related object is to provide an organopolysiloxane having improved stability with attendant increased shelf life prior to final cure. A preferred weak organic base is quinoline. The organic base is not a catalyst but serves to at least partially neutralize the acid that is present and thereby improve stability of the organopolysiloxane against gelation.

Although alkyl trialkoxysilanes are preferred, the present invention is adapted to a broader class of hydrolyzable silanes corresponding to the formula:

$T_nSiZ_{(4-n)}$ in which T is a monovalent hydrocarbon radical, Z is hydroxyl or a monovalent hydrolyzable group, and n is a whole number less than 4.

In one form, the process comprises hydrolyzing a hydrolyzable silane of the type described in aqueous solution containing at least the stoichiometric amount of water required for complete hydrolysis of the silane. After hydrolysis, the hydrolyzed silane is condensed as by heating to form the organopolysiloxane. During condensation the weak organic base may be present in a trace amount up to about 1.5 percent by weight of the aqueous solution.

The amount of water present in the reaction mixture can effect physical properties of the resulting polysiloxanes. As a rule, the molar ratio of the water and hydrolyzable silane is within the range of about 1.5:1 to about 10:1, respectively. The hydrolyzed silane can be condensed to an organopolysiloxane by heating the reaction mixture, such as at a temperature within the range of about 40° C. to about 300° C. for about 1 hour to about 10 hours.

The organopolysiloxane products of the invention can, if desired, be shaped as solid, integral castings. Or the polysiloxanes can be used as coating compositions for various substrates. The hydrolyzed silanes can be directly condensed to the organopolysiloxanes desired; or the hydrolyzed silanes can be partially condensed and concentrated to a precure organopolysiloxane which is capable of further cure. Such a partially condensed organopolysiloxane may be applied still in solution to a point of use and then finally cured to a hard, solid, thermoset state. This practice is particularly available with the present invention which provides increased shelf life for the not fully cured organopolysiloxane.

DESCRIPTION OF THE PREFERRED EMBODIMENTS

In general, the present organopolysiloxanes are prepared by hydrolysis of a hydrolyzable silane in an aqueous solution which contains at least the stoichiometric amount of water required for complete hydrolysis of the silane. Following hydrolysis, the hydrolyzed silane is condensed to form the organopolysiloxane which may be cast, molded, or otherwise shaped to a thermoset form, as may be desired.

It has been discovered that the resulting organopolysiloxane has improved stability against increasing viscosity and gelation, if a weak organic base having an ionization constant in water no greater than about $1 \times 10^{-7}$ at 25° C. is added in a stabilizing amount to a reaction mixture forming the organopolysiloxane at any time subsequent to hydrolysis and prior to the final cure of the organopolysiloxane to a solid state.

The various components of the reaction mixture are discussed together with preferred process steps in the hydrolysis and condensation of the hydrolyzable silane. Examples described specific processes illustrating the value of the presence of a weak organic base.

Hydrolyzable silanes useful in the present invention may be the same as those described in my prior U.S. Pat. No. 3,428,599 which is hereby incorporated by reference. However, it is to be noted that previously only quite pure monomers were preferably used. The present invention permits the use of relatively impure monomers and avoids expensive purification steps of such monomers.

For example, hydrolyzable silanes useful in the present invention include but are not restricted to those corresponding to the formula:

$$T_n SiZ_{(4-n)} \quad (1)$$

in which T is a monovalent hydrocarbon radical such as alkyl including cycloalkyl, alkenyl, and aryl radicals, each radical having less than seven carbon atoms; Z is hydroxyl or a group hydrolyzable to hydroxyl, such as alkoxy less than seven carbon atoms, acyloxy less than seven carbon atoms, or halogen; an n is a whole number less than four.

As indicated, some or all the Z's in Formula 1 can represent a hydroxyl group. The term "hydrolyzable" as used here and in the claims, includes within its meaning compounds where the hydrolyzable group or groups have already been hydrolyzed to a hydroxyl group or groups, unless it is clear from the context that a more limited meaning is intended. The terms "hydrolysis" product and "condensation" product as used here and in the claims include within their meanings the co-hydrolysis and co-condensation products that result when mixtures of silicon-containing starting reactants are employed in the reaction mixture.

Preferably, the hydrolyzable silanes that are used are trialkoxysilanes and include but are not restricted to those corresponding to the formula:

$$RSi(OR_1)_3 \quad (2)$$

in which preferably R is alkyl from 1 to about 6 carbon atoms and phenyl, and $R_1$ is alkyl from 1 to about 6 carbon atoms.

When R and $R_1$ are alkyl, they may be the same or different and include methyl, ethyl, propyl, isopropyl, butyl, isobutyl, pentyl, isopentyl, hexyl, isohexyl, and the like. Specific examples include methyltrimethoxysilane, methyltriethoxysilane, methyltri-n-propoxysilane, methyltriisopropoxysilane, (1,1-dimethylethyl) tripropoxysilane, methyltributoxysilane, hexyltriethoxysilane, phenyltrimethoxysilane, phenyltriethoxysilane, and the like. It is understood that mixtures of the defined trialkoxysilanes can be used.

Using methyltrialkoxysilane as an example, hydrolysis of a hydrolyzable silane can be represented as:

$$CH_3Si(OR_1)_3 + 3H_2O = CH_3Si(OH)_3 + 3R_1OH \quad (3)$$

$$nCH_3Si(OH)_3 = (CH_3SiO_{1.5})_n + 1.5nH_2O \quad (4)$$

or overall $$nCH_3Si(OR_1)_3 + 1.5nH_2O = (CH_3SiO_{1.5})_m + 3n\text{-}R_1OH \quad (5)$$

in which $R_1$ is as previously defined in Formula 1, and m represents a number corresponding to the degree of polymerization and is greater than one.

The concentration of water in the reaction mixture for the initial hydrolysis reaction should be at least the stoichiometric amount required for complete hydrolysis of the silane. As indicated by Equation 4, the minimum amount is 1.5 mole of water per mole of silane. Organopolysiloxane resins can be prepared at this water concentration. But a smaller water content in the reaction mixture leads to polymers that are rubbery and soft, presumably due to incomplete hydrolysis which leaves residual alkoxy groups in the partial condensation product. The molar ratio of water to silane can be as high as 10. However, if the water to silane molar ratio is in the range of about 1.5 to about 5, the alkanol by-product formed during hydrolysis acts as a solvent for the other products and reactants, and the initially heterogenous reaction mixture becomes clear and homogenous. This homogeneity allows more uniform control of resin formation.

If the water to silane molar ratio is within the range of 5:1 to 10:1, useful polysiloxanes are still obtained, but the alkanol formed is insufficient to convert the aqueous medium to a solvent for the reactants and products. In this case it is possible that resin precipitation can occur. However, insolubility of resinous products at such higher water concentrations can be overcome by adding a water-miscible organic solvent such as ethanol, propanol, etc. At water concentrations above about 10 moles of water per mole of silane, gel formation can occur even if sufficient solvent is added to make the reaction mixture homogeneous.

The exact upper limit of the water to silane molar ratio depends upon such factors as the exact silanes used, time and temperature, and the like. Accordingly, it is not possible to set forth precisely the upper limit, but it can be determined by simple trial and error tests in each case. The molar ratios within which no addition of organic solvent is required, such as from about 1.5 to about 5 moles of water per mole of silane are preferred.

In accordance with the present invention, a weak organic base having an ionization constant in water no greater than about $1 \times 10^{-7}$ at 25° C. is present in the reaction mixture. The organic base should not be present during the initial hydrolysis, but it can be added after hydrolysis is sufficiently advanced to avoid any chemically reactive interference. The base may be added at any time during or prior to complete condensation and polymerization of the organopolysiloxane to a solid state. Accordingly, the weak organic base may be included in the reaction mixture after hydrolysis but before condensation, or even after condensation has started. Preferably, the agent is added after hydrolysis is complete and before condensation has started. The purpose of the weak organic base is primarily to neutralize at least some of the acid present.

Desirably, the weak organic base is a trivalent, nitrogen-containing base having an ionization constant in water at 25° C. within the range of about $1 \times 10^{-7}$ to about $1 \times 10^{-14}$ and preferably a cyclic trivalent, nitrogen-containing organic base. Among such organic bases are quinoline, aniline, benzidine, acetanilide, pyridine, and toluidine, including all three isomeric forms of the latter. Quinoline is preferred. These compounds have the following ionization constants in water at 25° C.:

| Base | Ionization Constant |
| --- | --- |
| Quinoline | $6.30 \times 10^{-10}$ |
| Aniline | $3.83 \times 10^{-10}$ |
| Benzidine | $9.3 \times 10^{-10}$ |
| Acetanilide | $4.1 \times 10^{-14}$ |
| Pyridine | $1.4 \times 10^{-9}$ |
| o-Toluidine | $3.3 \times 10^{-10}$ |
| m-Toluidine | $5.5 \times 10^{-10}$ |
| p-Toluidine | $2.2 \times 10^{-9}$ |

Any amount of the weak organic base used in the reaction mixture, even a trace, effects some advantage since it neutralizes some acid. The maximum amount of useful organic base is that required to neutralize all of the acid present. The base is usually present in an amount of about 5 ppm to about 1.5% by weight of the aqueous reaction mixture. More base may be required to neutralize acid which is formed by oxidation of the alcohol released as a by-product. However, more than about 1% of the weak organic base may be wasteful, such that a more usual range is about 600 ppm to about 1% by weight of the aqueous polysiloxane reaction mixture.

The initial hydrolysis-condensation reaction may be carried out by placing in a suitable vessel pure water, the hydrolyzable silane, and for example hydrochloric acid as a catalyst in an amount up to 700 ppm. The upper limit of permissible acid content during initial hydrolysis-condensation is that beyond which gel formation occurs. The lower limit is determined by the desired reaction time. The resulting mixture is then heated under reflux. The initially cloudy reaction mixture clears on heating, usually within an hour, because the alcohol formed as a hydrolysis by-product dissolves the other components of the mixture. A suitable degree of hydrolysis-condensation is usually obtained if reflux is allowed to proceed for about one hour to about four hours after the mixture has cleared. This step can be carried out at temperatures lower than reflux, but the rate is slower.

Following hydrolysis of the silane to form a silanetriol, the latter is converted to an organopolysiloxane. This can be accomplished in general by heating the reaction mixture represented by the aqueous solution at a temperature from about 40° C. to about 300° C. for about one hour to about 10 hours, and preferably from about 70° C. to about 150° C. for about two to four hours. However, in practice, it is preferred to obtain the organopolysiloxane by a procedure within the stated temperature and time ranges which embodies concentrating the aqueous solution with attendant removal of by-products.

For example, after hydrolyzing the silane, the aqueous solution may be heated gradually to a final temperature of about 65° C. to about 300° C. and preferably from about 70° C. to about 150° C., while gradually removing by volatilization alkanol by-products and some water. As an instance, the volatilization and removal of aklanol by-products and water may take place with continuing condensation and heating within the range of about 70° C. to about 300° C., and preferably from about 90° C. to about 220° C., for a time short of solid or gel formation in the indicated temperature ranges.

The reaction mixture from the initial hydrolysis-condensation is concentrated by removing volatile components by distillation as from the vessel containing it. All of the solvents, such as water and by-product alkanol, should not be removed, or the resin will have a tendency to gel. Indeed the alkanol is a solvent for the weak organic base and serves to keep it in solution. Usually removal of about 80 mole percent of the alkanol by-product provides a residue convenient to manipulate further as herein described. The concentrate so obtained is further heated as herein described, conveniently while stirring in an open vessel. The elimination of water and other volatile materials from the reaction mixture at this point leads to further polymerization, and the mixture becomes increasingly viscous.

At pressures near one atmosphere, temperatures within the range of about 40° C. to the reflux temperature of the mixture are useful. Temperatures much below this range require substantially longer times for reaction, but they are operable. For example, temperatures as low as 20° C. may be used when the time of reaction may be as much as ten hours or more. In general, temperatures at or near the reflux temperature of the reaction mixture are preferred.

As evidenced by Equations 3 and 5 some alkanol by-product is retained in the reaction mixture during initial hydrolysis and condensation. This control of the rate of resin formation prevents premature gelling and allows the preparation of highly cross-linked polymers with good dimensional stability. If the by-product alkanol concentration is allowed to fall substantially below 1.5 moles of alkanol per mole of silane monomer (assuming complete hydrolysis of the silane), gel formation occurs. This limit can vary slightly with the particular conditions and materials used.

As indicated, the described heating of the reaction mixture to a temperature above its initial reaction temperature to a maximum temperature, such as within the range of about 65° to about 300° C., removes some but not all volatile material including the alkanol by-product and water. This procedure can be interrupted to obtain a liquid residue, or it can be carried to completion to form a hardened, thermoset organopolysiloxane. The elimination of water and other volatile materials makes the reaction mass increasingly viscous. When the condensation is interrupted short of complete cure while still leaving a liquid resin or liquid organopolysiloxane, the heating step is of the nature of a precure heating step. The purpose of precure is to effect controlled removal of the remaining volatiles while siloxane condensation continues at a convenient rate but slowly enough to avoid gel formation. As used here and in the claims, terms like "liquid siloxane partial condensation product", "liquid organopolysiloxane", "liquid resin", and the like are intended to include compositions obtained during a precure step which are still in a liquid or solution state. For example, the precure resinous products may be in solution in a mixture of water and a by-product alkanol, with or without other added solvent, or the precure resinous products may be dissolved in a single organic solvent or a mixture of organic solvents which may be miscible or immiscible with water.

Precuring can be carried out such that the product is a liquid, organic solvent-soluble, organopolysiloxane suitable for use as, for instance, a casting resin, or as a coating, potting, adhesive or similar composition, or as a component of such compositions. Alternatively, precuring of the liquid siloxane partial condensation product can be continued to a point where, upon cooling, a solid, heat-softenable, solvent soluble siloxane partial condensation product is obtained which can be converted upon further curing, as by heating, from a thermosetting organopolysiloxane resin to one that is substantially fully cured over thermoset. For instance, such a solid, thermosetting, organopolysiloxane resin can be obtained as an intermediate product during the low-temperature curing of a concentrated liquid siloxane partial condensation product that has been cast into a mold.

In use, therefore, hydrolysis and condensation of the trialkoxysilane can take place as one continuous operation as when the aqueous reaction mixture of the silane is applied to a point of use, and the condensation reaction continued until a thermoset, resinous organopolysiloxane is obtained. As previously noted, the organic base is not included until after hydrolysis. Or, the condensation reaction can be interrupted to form any of the precure reaction products which, themselves, are later applied to a point of use and condensation continued until a desired end product is obtained. In the precure reaction products, the partial siloxane condensation product does not usually exceed 90 weight percent of the solution. The finally cured products are substantially solid and possess a high degree of cross-linking.

Variations in the procedures for the preparation of the organopolysiloxanes can be carried out by individually hydrolyzing two or more different hydrolyzable silanes and then condensing them together. For example, it is possible to hydrolyze individually a methyl trialkoxysilane and a phenyl trialkoxysilane, and then combine the resulting products to form a reaction mixture that is further processed as previously described. The resulting co-condensation product ultimately yields when fully cured a solid, organopolysiloxane body.

It is understood that various additives can be incorporated into the present polysiloxane resinous products, such as those which are substantially chemically inert under the reaction conditions. Such additives include filler materials like silica, alumina, diatomaceous earth, clays like kaolin, bentonite, etc., coloring agents like alcohol or water-soluble dyes or insoluble pigments, opacifiers, plasticizers, etc.

The following examples only illustrate the invention and should not be construed as imposing limitations on the claims.

EXAMPLES 1

In accordance with the present invention, a less pure and less expensive monomeric precursor was used and purification prior to use, as is normally done, for example, by distillation, was omitted. Condensation of the precursor is not nearly so sensitive to those reactions in the presence of a weak organic base as herein described.

A reaction mixture was prepared comprising 136 grams of methyltriethoxysilane, pure water in an amount to form a water to silane molar ratio of 2.5:1, and about 50 ppm of hydrochloric acid. The reaction mixture was heated at reflux conditions for about 4 hours, while about 50% of the alcohol resulting from hydrolysis was removed by distillation.

At the completion of this reflux period, quinoline was added to the reaction solution in an amount of about 5 milliliters per 100 pounds of solution. The organopolysiloxane solution was then stirred to obtain a homogenous reaction mixture which was next stripped, as by further reflux action, of some but not all of the by-product ethanol, after which an additional 5 milliliters of quinoline was added per 100 pounds of reaction mixture. The amounts of quinoline added are necessarily expressed in this manner because so little of the weak organic base is actually needed.

The reaction mixture was then passed through a thin film evaporator which heated the mixture to about 180° C. for a dwell time of about 30 seconds. This resulted in organopolysiloxane resin which is capable of further cure to a solid thermoset state. The partially condensed organopolysiloxane reaction mixture could be converted at this time by curing to a solid thermoset form or marketed as the resin for subsequent curing to a solid thermoset form.

The quinoline neutralized at least part of the acid in the reaction mixture. Actually, the weak organic neutralizing base used in this invention could be employed at any stage after hydrolysis where it is desired to control the acidity of the starting reactants and/or the siloxane partial condensation products. In some instances, it may be advantageous to mix the weak organic base with a reaction mixture after hydrolysis prior to condensation to a partial condensation product. Or, alternatively, the weak organic base may be added to the reaction mixture during condensation to a siloxane partial condensation product, or immediately prior to or during the initial stages of precure of the condensation product. Once condensation has started, it is still possible to add the weak organic base any time, as long as the partially cured organopolysiloxane still contains sufficient residual water and/or alcohol by-product to dissolve the weak organic base.

In order to be marketable, an organopolysiloxane reaction product, produced as described, must have long term shelf life which, in turn, means shelf stability. This enables the product to be packaged and shipped to a point of use and then stored, if desired, until needed for casting, molding, or otherwise shaping and curing of the resinous product into a final solid thermoset state.

One test for stability is the solubility of the product in ethanol as a function of time at a constant temperature. In this example, an ethanol solubility check was periodically made on the organopolysiloxane reaction product produced as described while it was maintained in an oven at 50° C. Typically, 24 hours at 50° C. is equivalent to 14 days at room temperature.

The organopolysiloxane reaction product of this example using quinoline was still soluble in ethanol after 96 hours at 50° C. This is equivalent to about 56 days or about 2 months at room temperature. In this case, therefore, quinoline allowed preparation of a marketable polysiloxane resinous product from impure monomers without going through an expensive purification process.

In place of the methyltriethoxysilane, any of the previously disclosed hydrolyzable silanes could have been used. Similarly, in place of quinoline, any of the previously disclosed weak organic bases could have been used.

EXAMPLE 2

A procedure was carried out like the procedure of Example 1, except that the quinoline was omitted. The resulting polysiloxane reaction product became insoluble in ethanol in as little as 24 hours at 50° C. Therefore, the use of quinoline in Example 1 extended the shelf life of the polysiloxane four-fold.

When pure methyltriethoxysilane was used as the starting monomer in the same process, the shelf life of the resulting organopolysiloxane reaction product increased to 72 hours at 50° C. or the equivalent of 42 days at room temperature. This value is still substantially below the shelf life of the organopolysiloxane obtained from impure methyltriethoxysilane when quinoline was present in accordance with Example 1.

EXAMPLES 3 AND 4

Two additional but separate processes were carried out, each like the process of Example 1, except that a different organic trivalent nitrogen-containing base was used in each process that was not in accordance with the present invention. That is, each base had an ionization constant greater than $1 \times 10^{-7}$ at 25° C. in water.

In one process run, piperdine having an ionization constant of $1.6 \times 10^{-3}$ at 25° C. was used; in the other process run piperazine having an ionization constant of $6.4 \times 10^{-5}$ at 25° C. was used. In each instance, the organic bases were too strong and failed satisfactorily to extend the shelf life of the resulting organopolysiloxane reaction products. These products acted the same as when a strong acid medium is present and gelled too quickly to constitute a marketable product.

Although the foregoing describes several embodiments of the present invention, it is understood that the invention may be practiced in still other forms within the scope of the following claims:

I claim:

1. In a process for preparing an organopolysiloxane by hydrolyzing a hydrolyzable silane in an aqueous solution containing at least the stoichiometric amount of water required for said hydrolysis and having an acid pH, and then condensing the hydrolyzed silane to the organopolysiloxane, the improvements comprising incorporating in said aqueous solution after hydrolysis of said silane and prior to complete condensation and polymerization of the organopolysiloxane to a solid state, a stabilizing amount against gelation of a weak organic base having an ionization constant in water no greater than about $1 \times 10^{-7}$ at 25° C. to at least partially neutralize the acid of said water and provide improved stability to said organopolysiloxane against gelation.

2. The process of claim 1 in which the molar ratio of said water to said hydrolyzable silane is within the range of about 1.5:1 to about 10:1, respectively.

3. The process of claim 1 in which said hydrolyzable silane corresponds to the formula:

$$T_nSiZ_{(4-n)}$$

in which T is a monovalent hydrocarbon radical, Z is hydroxyl or a monovalent hydrolyzable group, and n is a whole number less than four.

4. The process of claim 1 in which said hydrolyzable silane corresponds to the formula:

$$T_nSiZ_{(4-n)}$$

in which T is alkyl, alkenyl, or aryl, each of less than seven carbon atoms, z is hydroxyl, alkoxy less than seven carbon atoms, acyloxy less than seven carbon atoms, or halogen and n is a whole number less than four.

5. The process of claim 1 in which said hydrolyzable silane is a hydrolyzable trialkoxysilane in which any alkoxy substituent contains from one to about six carbon atoms.

6. The process of claim 1 in which said hydrolyzable silane corresponds to the formula:

$$RSi(OR_1)_3$$

in which R is alkyl from one to about six carbon atoms or phenyl, and $R_1$ is alkyl from one to about six carbon atoms.

7. The process of claim 1 in which said condensing is by heating of the solution at a temperature within the range of about 40° to about 300° C. for about one hour to about ten hours.

8. The process of claim 1 in which said weak organic base is a trivalent, nitrogen-containing organic base.

9. The process of claim 1 in which said weak organic base is selected from the group consisting of quinoline, aniline, benzidine, acetanilide, pyridine, and toluidine.

10. The process of claim 1 in which said weak organic base is quinoline.

11. The process of claim 1 in which said stabilizing amount of said weak organic base is within the range of about 5 ppm to about 1.5% by weight of said aqueous solution.

12. The process of claim 1 in which said ionization constant is within the range of about $1 \times 10^{-7}$ to about $1 \times 10^{-14}$.

13. The process of claim 1 including forming the organopolysiloxane to a desired shape, and then heating to cure the organopolysiloxane to a thermoset form having said shape.

14. A process for preparing an organopolysiloxane solution having improved stability against gelation, comprising:

(a) hydrolyzing in aqueous solution a hydrolyzable silane corresponding to the formula:

$$T_nSiZ_{(4-n)}$$

in which T is a monovalent hydrocarbon radical, Z is hydroxyl or a monovalent hydrolyzable group, and n is a whole number less than four, (b) said aqueous solution having a molar ratio of water to hydrolyzable silane within the range of about 1.5:1 to about 5:1, respectively, (c) heating said solution to condense the hydrolyzed silane and polymerize it to an organopolysiloxane, and (d) adding to said aqueous solution subsequently to said hydrolysis of the hydrolyzable silane and prior to complete condensation and polymerization of the organopolysiloxane to a solid state a stabilizing amount against gelation of a trivalent, nitrogen-containing weak organic base having an ionization constant in water at 25° C. within the range of about $1 \times 10^{-7}$ to about $1 \times 10^{-14}$.

15. The process of claim 14 in which said trivalent, nitrogen-containing organic base is selected from the group consisting of quinoline, aniline, benzidine, acetanilide, pyridine, and toluidene.

16. An organopolysiloxane resulting from the process of claim 1, said organopolysiloxane being still soluble in ethanol after about two months at room temperature.

17. An organopolysiloxane resulting from the process of claim 14, said organopolysiloxane being still soluble in ethanol after about two months at room temperature.

18. An organic solvent-soluble siloxane partial condensation product resulting from the process of claim 1, said condensation product still being soluble in ethanol after about two months at room temperature.

19. A composition adapted for shaping into a desired form comprising a solution containing an organic solvent-soluble siloxane partial condensation product resulting from the process of claim 1, the amount of said siloxane condensation product not exceeding 90 weight percent of said solution, said condensation product being still soluble in ethanol after about two months at room temperature.

20. A composition adapted for shaping to a desired form comprising a solution containing an organic solvent-soluble siloxane partial condensation product resulting from the process of claim 14, the amount of said siloxane condensation product not exceeding 90 weight percent of said solution, said condensation product being still soluble in ethanol after about two months at room temperature.

* * * * *